US006569485B2

(12) United States Patent
Hussein

(10) Patent No.: US 6,569,485 B2
(45) Date of Patent: *May 27, 2003

(54) POURABLE DESSERT LIQUID PRODUCT

(75) Inventor: Ahmed Abdi Hussein, Niagara Falls (CA)

(73) Assignee: Rich Products Corp., Buffalo, NY (US)

( * ) Notice: Subject to any disclaimer, the term of this patent is extended or adjusted under 35 U.S.C. 154(b) by 190 days.

This patent is subject to a terminal disclaimer.

(21) Appl. No.: 09/774,647

(22) Filed: Feb. 1, 2001

(65) Prior Publication Data

US 2001/0005524 A1 Jun. 28, 2001

Related U.S. Application Data

(63) Continuation of application No. 09/044,615, filed on Mar. 19, 1998, now Pat. No. 6,197,362
(60) Provisional application No. 60/041,014, filed on Mar. 19, 1997.

(51) Int. Cl.$^7$ .................... A23C 9/00; A23G 13/00
(52) U.S. Cl. .................. 426/585; 426/94; 426/302; 426/586; 426/587; 426/588; 426/660
(58) Field of Search ................ 426/585, 586, 426/587, 588, 600, 94, 302

(56) References Cited

U.S. PATENT DOCUMENTS

| 2,970,918 | A |   | 2/1961  | Perersen      | 99/139  |
|-----------|---|---|---------|---------------|---------|
| 3,510,316 | A |   | 5/1970  | Decker        | 99/136  |
| 3,935,325 | A |   | 1/1976  | Gilmore et al.| 426/613 |
| 4,107,343 | A |   | 8/1978  | Petricca      | 426/564 |
| 4,110,476 | A |   | 8/1978  | Rhodes        | 426/41  |
| 4,146,652 | A |   | 3/1979  | Kahn et al.   | 426/564 |
| 4,308,287 | A |   | 12/1981 | Kahn et al.   | 426/43  |
| 4,353,932 | A |   | 10/1982 | Bone          | 426/532 |
| 4,434,186 | A | * | 2/1984  | Desia et al.  | 426/565 |
| 4,435,439 | A | * | 3/1984  | Morris        | 426/565 |
| 4,497,841 | A |   | 2/1985  | Wudel et al.  | 426/565 |
| 4,511,590 | A |   | 4/1985  | Caldwell      | 426/580 |
| 4,552,773 | A |   | 11/1985 | Kahn et al.   | 426/564 |
| 4,626,441 | A |   | 12/1986 | Wolkstein     | 426/548 |
| 4,631,196 | A |   | 12/1986 | Zeller        | 426/580 |
| 4,840,813 | A |   | 6/1989  | Greenberg et al.| 426/565 |
| 4,853,243 | A |   | 8/1989  | Kahn et al.   | 426/564 |
| 5,171,602 | A |   | 12/1992 | Martin et al. | 426/567 |
| 5,358,728 | A |   | 10/1994 | Martin et al. | 426/565 |
| 5,486,372 | A |   | 1/1996  | Martin et al. | 426/565 |
| 5,958,476 | A |   | 9/1999  | Cain et al.   | 426/68  |
| 6,033,711 | A |   | 3/2000  | Gonsalves et al.| 426/565 |

FOREIGN PATENT DOCUMENTS

| EP | 0 868 850 A1 | 10/1998 |
| JP | 3 63-279752  | 11/1988 |
| WO | 94/21138     | 9/1994  |

OTHER PUBLICATIONS http:hananproducts.com; Tres Leches Traditional Latin Dessert Mix specification Sheet. No date available yet.*

* cited by examiner

Primary Examiner—Nina Bhat
(74) Attorney, Agent, or Firm—Kenyon & Kenyon

(57) ABSTRACT

A pourable dessert liquid product comprising a protein source; fat; sweetener; stabilizer; flavoring agent; and emulsifier.

47 Claims, No Drawings

POURABLE DESSERT LIQUID PRODUCT

This application is a continuation of application Ser. No. 09/044,615, filed Mar. 19, 1998, now U.S. Pat. No. 6,197,362, which issued on Mar. 6, 2001, which claims the benefit of Provisional Application Ser. No. 60/041,014, filed Mar. 19, 1997.

SUMMARY OF THE INVENTION

The invention is directed to a pourable dessert liquid product comprising a dairy or non-dairy protein source, fat, sweetener, stabilizer, emulsifier, and a flavoring agent.

BACKGROUND OF THE INVENTION

Mixtures of dairy components for incorporation into food products are known in the food industry. These food products include nutritious drink mixes and dessert cakes such as a sponge cake soaked with a blend of three milks and then decorated with a topping. One such dessert product is marketed under the trade name known as "Tres Leches." The dairy mix for such dessert products is prepared through laboriously blending three milk products, i.e., whole milk, sweetened condensed milk, and evaporated milk. However, such dairy mixes are difficult to prepare and require maintaining fresh inventory of the separate components, leading to storage and sanitary problems.

It is an object of this invention to provide a pourable dessert liquid product for use in food products, which provides the creaminess, consistency and the traditional flavor of the above-described food products. It is another object of this invention to provide a pourable dessert liquid product that it is ready to use, does not require laboriously mixing different milks and thus provides a more sanitary operation, and reduces metal contamination due to the elimination of extraneous product casings. In addition, it is a further object of this invention to provide a base product that can be flavored by various flavoring agents and provides nutritional advantage, e.g., that may be formulated to have no animal fat or cholesterol but still maintains comparable levels of protein to those of the dairy equivalents. It is yet another object of this invention to provide a single pourable dessert liquid product which may be either dairy or non-dairy, is freezable, is consistent in quality and overall improves the sanitary and keeping quality since only a single liquid is used with no exposure to contamination as in the case of mixing three separate milks.

DETAILED DESCRIPTION OF THE INVENTION

The above-stated objectives and others are achieved by a pourable dessert liquid product comprising a dairy or non-dairy protein source, fat, sweetener, stabilizer, emulsifier and a flavoring agent.

The amount of the dairy or non-dairy protein source should be about 2 weight % to about 20 weight % of the product, preferably about 4 weight % to about 12 weight %. Examples of dairy protein source include dried skim milk, whey protein, and milk protein concentrate; examples of non-dairy protein source include caseinate and vegetable protein sources such as soy protein isolate, soy protein concentrate, and the like. Preferred protein sources include dried skim milk and caseinate.

The amount of fat in the product should be about 1 weight % to about 15 weight %, preferably about 4 weight % to about 12 weight %. Examples of fats include vegetable oils such as soy bean oil, sunflower oil, canola oil, modified canola oil, palm kernal oil, coconut oil, dairy fats, dairy cremes and the like. Preferred fats include vegetable oil, palm kernal oil and coconut oil.

The amount of sweetener should be about 4 weight % to about 35 weight % of the product, preferably about 10 weight % to about 25 weight %. Examples of sweeteners include sucrose, corn syrup including dextrose and high fructose corn syrup, artificial sweeteners, low or no calorie sweeteners, and the like. Preferred sweeteners include sucrose and corn syrup.

The amount of stabilizer should be about 0.01 weight % to about 2.0 weight % of the product, preferably about 0.01 weight % to about 1.0 weight %. Examples of stabilizers include carrageenan, guar gum, locust bean gum, xanthan gum, cellulose, modified cellulose, hydrocolloids, and the like. Preferred stabilizers include carrageenan.

The amount of flavoring agent should be about 0.1 weight % to about 2.0 weight % of the product, preferably about 0.2 weight % to about 0.6 weight %. Examples of flavoring agents include conventional flavoring agents such as condensed milk, vanilla, kahlua, coffee, mocha, raspberry, strawberry, citrus, fruit, liqueur flavor and the like. Preferred flavoring agents include condensed milk and vanilla.

The amount of emulsifier should be about 0.1 weight % to about 2.0 weight % of the product, preferably about 0.05 weight % to about 1 weight %. Examples of conventional emulsifiers include polysorbate such as polysorbate 60 and polysorbate 80, sodium stearyl lactylate, calcium stearyl lactylate, monoglyceride, diglyceride, hexaglycal distearyte, and the like. Preferred ingredients include polysorbate, mono or diglycerides and sodium stearyl lactylate.

It is contemplated that the pourable dessert liquid product may be incorporated into various types of other appropriate food products, such as dessert cakes, ready-to-use nutritious beverages, and any food products where condensed and/or evaporated milk is called for, such as french toast flavor, pudding, custards including extra rich custards, creme caramel, creme brulee, and the like. The pourable dessert liquid product may be mixed with various foods, liquids or flavorings, including eggs, cinnamon, coffee, cappuccino, coffee liqueur, coconut, nuts, chocolate, rum, and flavored mixes such as margarita, daiquiri, and pina colada. The food product may further comprise fruit or fruit toppings, such as strawberries, peaches, pineapples, mangoes and the like, or fruit products, such as conserves, marmalade and the like. The food product may also comprise a topping, including dairy or non-dairy whipped toppings such as Better Creme®, Rich Whip® and/or On Top®, nuts such as hazelnut, coconut, cinnamon and chocolate. Dessert cakes containing the pourable dessert liquid product may be prepared by soaking a suitable cake with an appropriate amount by weight of the pourable dessert liquid mix; e.g., the dessert cake may be soaked with the pourable dessert liquid to provide a soaked cake product. Suitable cakes include but are not limited to sponge cakes, layer cakes, sheet cakes, half sheet, and quarter sheet cakes. The weight ratio of the cake to liquid ranges from 1:1 to 1:2.5 cake to liquid weight, most preferably 1:1 to 1:1.5.

The food product may be manufactured and/or packaged in group or single portions. The food product may be frozen, stored, distributed, and thawed for subsequent consumption.

The pourable dessert liquid product may be prepared by conventional methods, including regular pasteurization (LTLT, HTST), Extended Shelf Life (ESL), Ultra High Temperature (UHT) and in-container sterilization.

In one embodiment, a dry blend of materials is prepared comprising the dairy or non-dairy protein source, stabilizer, emulsifier and optional dry sweeteners. An aqueous solution comprising the dry blend added to water having a temperature between about 160 and 180° F. is prepared. Liquid sweetener may be added at this time, followed by fat and flavor components at some point during the process. The heated solution is agitated and allowed to stand between 3 and 10 minutes at this temperature. Certain types of processing may require other time and temperature amounts, such as HTST 160–180° F. for 15 to 20 seconds to provide a product which can be distributed frozen; ESL 257–280° F. for 2 to 4 seconds to provide an extended shelf life product that can be stored at refrigerated temperature; Direct or Indirect UHT 286 to 292° F. for 2 to 4 seconds to provide a product which can be distributed at ambient temperature. The aqueous solution is then homogenized between about 500 and 2500 psi. The solution is cooled to about 33 to 45° F. The resulting product may then be packaged and frozen, refrigerated or stored at room temperature depending on the process used to make the product.

Non-limiting examples of the invention are provided below.

EXAMPLE 1

Formulation of Non-Dairy Pourable Dessert Liquid Mix

| Ingredient | Formulation | Usage/lb | Mixing procedure |
| --- | --- | --- | --- |
| Water | 42.00 | 4200.00 | Meter in hot water (120–150° F.) |
| Drew Pone 60 | 0.20 | 20.00 | Add Drew pone |
| Premix | | 0.00 | |
| Sodium Caseinate | 3.00 | 300.00 | Add premix and disperse |
| Salt Regular | 0.04 | 4.00 | Start heating to 165° F. |
| Dipotassium Phosphate | 0.30 | 30.00 | |
| Sodium Acid Phosphate | 0.02 | 2.00 | |
| Emplex (Flakes) | 0.00 | 0.00 | |
| Mono & Diglycerides | 0.30 | 30.00 | |
| Cir Beta Carotene Dry | 0.0005 | 0.05 | |
| Carrageenan | 0.0300 | 3.00 | |
| Guar Gum | 0.0000 | 0.00 | |
| Sugar granulated | 9.00 | 900.00 | |
| | | 0.00 | |
| Corn Syrup 36DE/43 | 28.00 | 2800.00 | Meter in Corn syrup |
| Dextrose | 0.00 | 0.00 | and hold at 165° F. for 5 minutes |
| Water | 8.89 | 889.00 | Add cold water |
| Oil Palm Kernel | 8.00 | 800.00 | Add palm oil |
| Cond. Milk Flvr | 0.20 | 20.00 | Add the flavors |
| Vanilla shade | 0.02 | 2.00 | Homogenize at 500/2500 psi |
| Total per formula | 100.00 | 10000.05 | Cool to 33 to 41° F. |

EXAMPLE 2

Formulation of Dairy Pourable Dessert Liquid Product

| Ingredient | Formulation | Usage/lb | Mixing procedure |
| --- | --- | --- | --- |
| Water | 42.00 | 2100.00 | Meter in hot water (120–150° F.) |
| Drew Pone 60 | 0.20 | 10.00 | Add Drew pone |
| Premix | | 0.00 | |
| Non Fat Dry Milk | 8.00 | 400.00 | Add premix and disperse |
| Salt Regular | 0.04 | 2.00 | Start heating to 165° F. |
| Dipotassium Phosphate | 0.30 | 15.00 | |
| Sodium Acid Phosphate | 0.02 | 1.00 | |
| Mono & Diglycerides | 0.30 | 15.00 | |
| Cir Beta Carotene Dry | 0.0005 | 0.03 | |
| Carrageenan | 0.0300 | 1.50 | |
| Sugar granulated | 14.00 | 700.00 | |
| Corn Syrup 36DE/43 | 5.00 | 250.00 | Meter in Corn syrup |
| | | | and hold at 165° F. for 5 minutes |
| Water | 21.70 | 1085.23 | Add cold water |
| Palm Oil Kernel | 8.00 | 400.00 | Add palm oil |
| Cond. Milk Flvr | 0.30 | 30.00 | Add the flavors |
| Vanilla shade | 0.01 | .25 | Homogenize at 500/2500 psi |
| Total per formula | 100.00 | 5000.00 | Cool to 33 to 41° F. |

What is claimed is:

1. A ready-to-use liquid dessert composition comprising about 4 to 12 wt % of a protein source;
   about 4 to 12 wt % fat;
   about 10 to 25 wt % sweetener;
   about 0.01 to 1 wt % stabilizer;
   about 0.2 to 0.6 wt % flavoring agent;
   and
   about 0.05 to 1 wt % emulsifier.

2. A dessert product comprising a food product selected from the group consisting of a cake, beverage, pudding, custard, creme caramel and creme brulee into which is incorporated a ready-to-use liquid dessert comprising about 4 to 12 wt % of a protein source;
   about 4 to 12 wt % fat;
   about 10 to 25 wt % sweetener;
   about 0.01 to 1 wt % stabilizer;
   about 0.2 to 0.6 wt % flavoring agent;
   and
   about 0.05 to 1 wt % emulsifier.

3. A ready-to-use liquid tres-leches dessert composition comprising from about 2% to about 20% protein;
   about 4 to about 12% fat;
   about 10% to about 25% sweetener comprising dry and/or liquid sweetener;
   about 0.01 to about 1% stabilizer;
   about 0.05 to about 1% emulsifier;
   and
   about 0.2% to about 0.6% flavoring agent.

4. The composition of claim 3 comprising about 3% protein.

5. The composition of claim 4 wherein the protein is dairy protein.

6. The composition of claim 5 wherein the protein is caseinate.

7. The composition of claim 3 wherein the protein is non-dairy protein.

8. The composition of claim 3 wherein the protein is non-fat dry milk protein.

9. The composition of claim 8 wherein the protein is dried skim milk protein.

10. The composition of claim 3 comprising about 25% sweetener.

11. The composition of claim 3 comprising about 19% sweetener.

12. The composition of claim 3 comprising about 8% protein;
    about 8% fat;
    about 19% sweetener;
    about 0.03% stabilizer;
    about 0.3% emulsifier and
    about 0.3% flavoring agent.

13. The composition of claim 12 wherein the protein comprises non fat dry milk.

14. The composition of claim 12 wherein the sweetener comprises corn syrup and sucrose.

15. The composition of claim 12 wherein the fat is palm kernel oil.

16. The composition of claim 3 wherein the sweetener comprises sweetener selected from the group consisting of sucrose, dextrose, corn syrup, high fructose corn syrup, artificial sweetener, low calorie sweetener, and no calorie sweetener.

17. The composition of claim 3 wherein the sweetener comprises dry sweetener, liquid sweetener or both.

18. The composition of claim 3 wherein the sweetener comprises sucrose, corn syrup or both.

19. The composition of claim 3 wherein the sweetener comprises artificial sweetener, low or no calorie sweetener.

20. The composition of claim 3 wherein the fat is selected from the group consisting of soy bean oil, sunflower oil, canola oil, modified canola oil, palm kernel oil, coconut oil, vegetable oil, dairy fats and dairy cream.

21. The composition of claim 20 wherein the fat is palm kernel oil.

22. The composition of claim 20 wherein the fat is vegetable oil.

23. The composition of claim 20 wherein the fat is coconut oil.

24. The composition of claim 3 wherein the stabilizer is selected from the group consisting of carageenan, guar gum, locust bean gum, xanthum gum, cellulose, modified cellulose, and hydrocolloids.

25. The composition of claim 24 wherein the stabilizer comprises carageenan.

26. The composition of claim 3 wherein the emulsifier is selected from the group consisting of polysorbate, sodium stearyl lactylate, calcium stearyl lactylate, monoglyceride, diglyceride and hexaglycal distearyte.

27. The composition of claim 3 wherein the emulsifier is selected from the group consisting of sodium stearyl lactylate, mono- and diglycerides and polysorbate.

28. The composition of claim 25 wherein the emulsifier comprises polysorbate 60 and mono- and diglycerides.

29. The composition of claim 3 wherein the emulsifier comprises mono- and diglycerides and polysorbate 60 and the stabilizer comprises carageenan.

30. A ready-to-use liquid tres-leches dessert composition comprising about 3% protein;
    about 8% fat;
    about 37% sweetener;
    about 0.03% stabilizer;
    about 0.3% emulsifier and
    about 0.3% flavoring agent.

31. The composition of claim 30 wherein the protein is sodium caseinate.

32. The composition of claim 30 wherein the fat is palm kernel oil.

33. The composition of claim 30 wherein the sweetener comprises corn syrup and sucrose.

34. A process of making a ready-to-use liquid tres-leches dessert composition comprising:
    forming a dry blend of protein, stabilizer, emulsifier and optional dry sweetener;
    preparing an aqueous solution of the dry blend with water and optional liquid sweetener;
    heating the aqueous solution to a temperature in the range of from about 160° F. to about 292° F.; and
    adding fat, flavoring and optional liquid sweetener to the aqueous solution, wherein the composition comprises about 2% to about 20% protein;
    about 4 to about 12% fat;
    about 10% to about 25% sweetener;
    about 0.01 to about 1% stabilizer;
    about 0.05 to about 1% emulsifier;
    and
    about 0.2% to about 0.6% flavoring agent.

35. The process of claim 34 wherein the aqueous solution of the dry blend comprises liquid sweetener.

36. The process of claim 34 wherein the aqueous solution is homogenized after mixing to form a homogenized solution.

37. The process of claim 36, further comprising packaging the homogenized solution in a package and sterilizing the homogenized solution in the package.

38. The process of claim 34 wherein after sterilization the composition is stored at ambient temperature, stored at refrigeration temperature or is frozen.

39. The process of claim 34 wherein the heating of the aqueous solution is conducted under pasteurization, extended shelf life, ultra high temperature or in-container sterilization conditions.

40. A process for making a ready-to-use liquid tres leches dessert composition comprising:

admixing protein, stabilizer, emulsifier, optional dry sweetener, and water to form an aqueous solution;

heating the aqueous solution to a temperature in the range of from about 160° F. to about 292° F.; and adding fat, flavoring and optional liquid sweetener to the aqueous solution, wherein the composition comprises about 2% to about 20% protein;

about 4 to about 12% fat;

about 10% to about 25% sweetener;

about 0.01 to about 1% stabilizer;

about 0.05 to about 1% emulsifier;

and about 0.2% to about 0.6% flavoring agent.

41. The process of claim 40, wherein the aqueous solution is maintained at a temperature between about 160 and 180° F. for between 3 and 10 minutes.

42. A dessert product comprising:

a cake; and a ready-to-use liquid tres leches dessert composition comprising about 2% to about 20% protein;

about 1 to about 15% fat;

about 4% to about 35% sweetener;

about 0.01 to about 2% stabilizer;

about 0.1 to about 2% emulsifier;

and about 0.1% to about 2% flavoring agent.

43. The dessert product of claim 42, wherein the cake is a sponge cake.

44. The dessert product of claim 42, wherein the dessert composition comprises about 2% to about 20% protein;

about 4 to about 12% fat;

about 10% to about 25% sweetener;

about 0.01 to about 1% stabilizer;

about 0.05 to about 1% emulsifier;

and about 0.2% to about 0.6% flavoring agent.

45. A method for making a dessert product comprising:

applying to a cake a ready-to-use liquid tres leches dessert composition comprising about 2% to about 20% protein;

about 1 to about 15% fat;

about 4% to about 35% sweetener;

about 0.01 to about 2% stabilizer;

about 0.1 to about 2% emulsifier;

and about 0.1% to about 2% flavoring agent.

46. The method of claim 45, wherein the cake is a sponge cake.

47. The method of claim 45, wherein the dessert composition comprises about 2% to about 20% protein;

about 4 to about 12% fat;

about 10% to about 25% sweetener;

about 0.01 to about 1% stabilizer;

about 0.05 to about 1% emulsifier;

and about 0.2% to about 0.6% flavoring agent.

* * * * *